Dec. 27, 1960   J. A. EARNEST   2,966,650
ELECTRICAL SLIP RING ASSEMBLY FOR TIRE WHEEL
Filed May 14, 1957   2 Sheets-Sheet 1
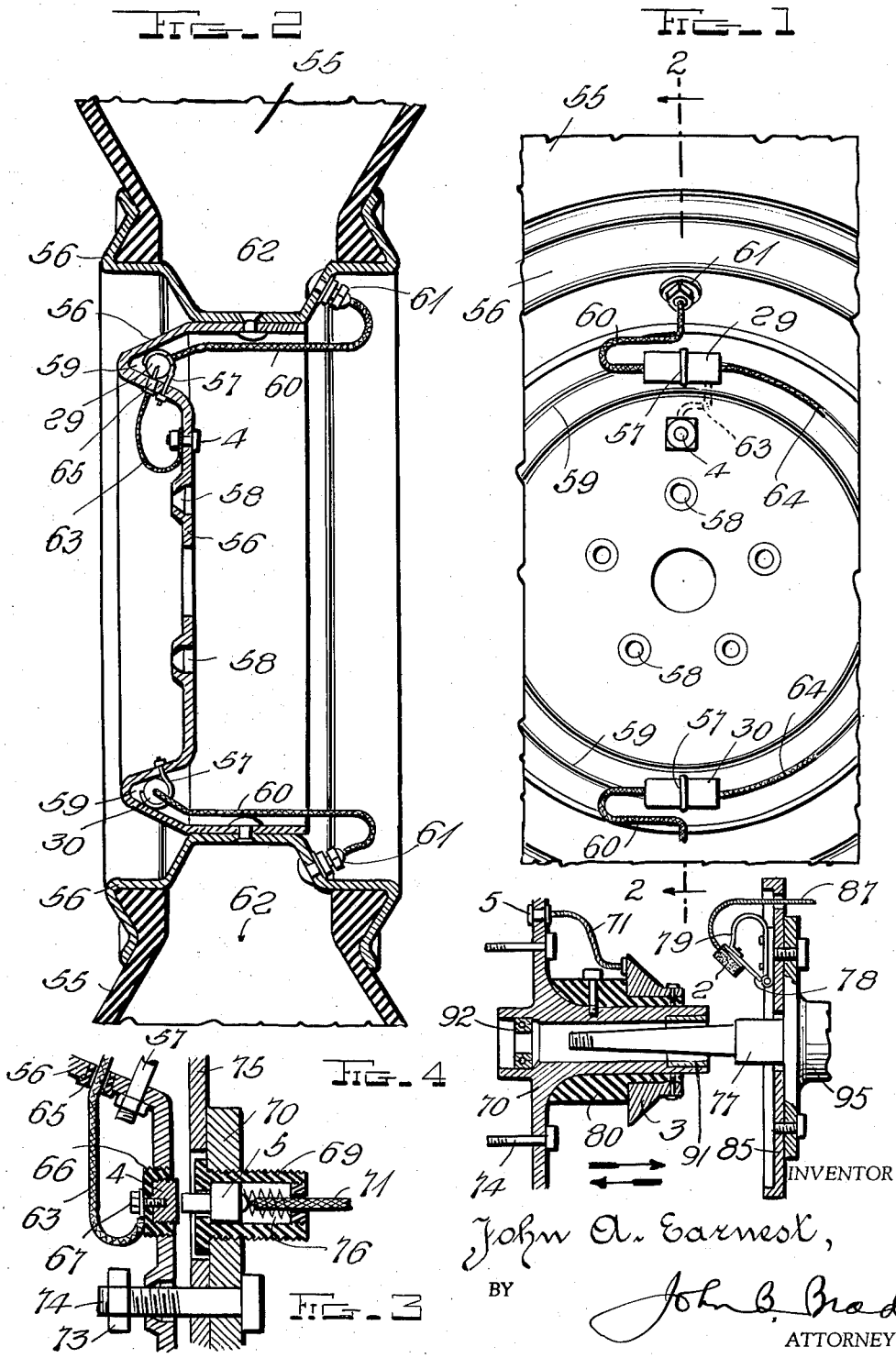
INVENTOR
John A. Earnest,
BY John B. Brady
ATTORNEY United States Patent Office 2,966,650
Patented Dec. 27, 1960

2,966,650

ELECTRICAL SLIP RING ASSEMBLY FOR TIRE WHEEL

John A. Earnest, 727 Havana, Greenville, Miss., assignor of one-half to Robert P. Sugg, Eupora, Miss.

Filed May 14, 1957, Ser. No. 658,985

8 Claims. (Cl. 339—3)

My invention relates to pneumatic tire alarm systems, and more particularly to an electrical system which automatically and simultaneously gives remote indication of vehicle tubeless pneumatic tire pressures to the vehicle operator while requiring no attention on his part.

The main objects of my invention are to provide an electrical tire alarm system which:

(a) Visually by gages indicates to the vehicle operator the pressure in each of the vehicle's tires simultaneously and continuously or warns him by lights that the pressure in a certain tire has dangerously decreased or increased;

(b) Is readily installable on any vehicle (car, truck, bus, etc.) using tubeless pneumatic tires;

(c) Employs relatively simple electrical circuits and in which the mechanical components are simple and at a minimum and are such that the possibility of system malfunctions are reduced to a minimum, thus requiring little maintenance;

(d) Employs indicating gages, lights, or alarms, and pressure sensitive control units or switches in order to make the cost of such a system reasonable and practical;

(e) Employs pressure responsive devices mounted on the vehicle tire rim independent to the tire valve stem in such a manner as not to interfere or add to the labor of installing a new tire casing on said tire rim.

Another object of my invention is to provide simple mechanical means of completing an electrical circuit for such a system from a rotating vehicle wheel assembly to the stationary part of the vehicle.

Another object of my invention is to provide such mechanical means of completing an electrical circuit which does not add to the slightest extent to the labor of removing or reinstalling a tire and rim assembly of the vehicle.

Another object of my invention is to provide mechanical means of completing an electrical circuit which do not add to the slightest extent to the labor of removing or reinstalling a brake drum assembly or a hub and bearing assembly while performing maintenance on the brake shoes or cylinders or on the wheel bearings.

Another object of my invention is to provide the mechanical means for completing said electrical circuit, from the rotating portion to the stationary portion of the vehicle wheel situated so as to be protected from the elements, thus decreasing the possibility of malfunctions.

Other and further objects of my invention reside in the construction of a circuit closing device on a vehicle wheel which is readily producible on a mass production scale at low cost as set forth more fully in the following specification by reference to the accompanying drawings in which:

Fig. 1 is a partial rear elevational view of a vehicle tire and rim assembly showing the mounting arrangement of the pressure switch in the system of my invention;

Fig. 2 is a transverse sectional view taken substantially along line 2—2 of Fig. 1;

Fig. 3 is an enlarged transverse sectional view of the quickly disconnected contact point used in the structure of my invention;

Figure 5:
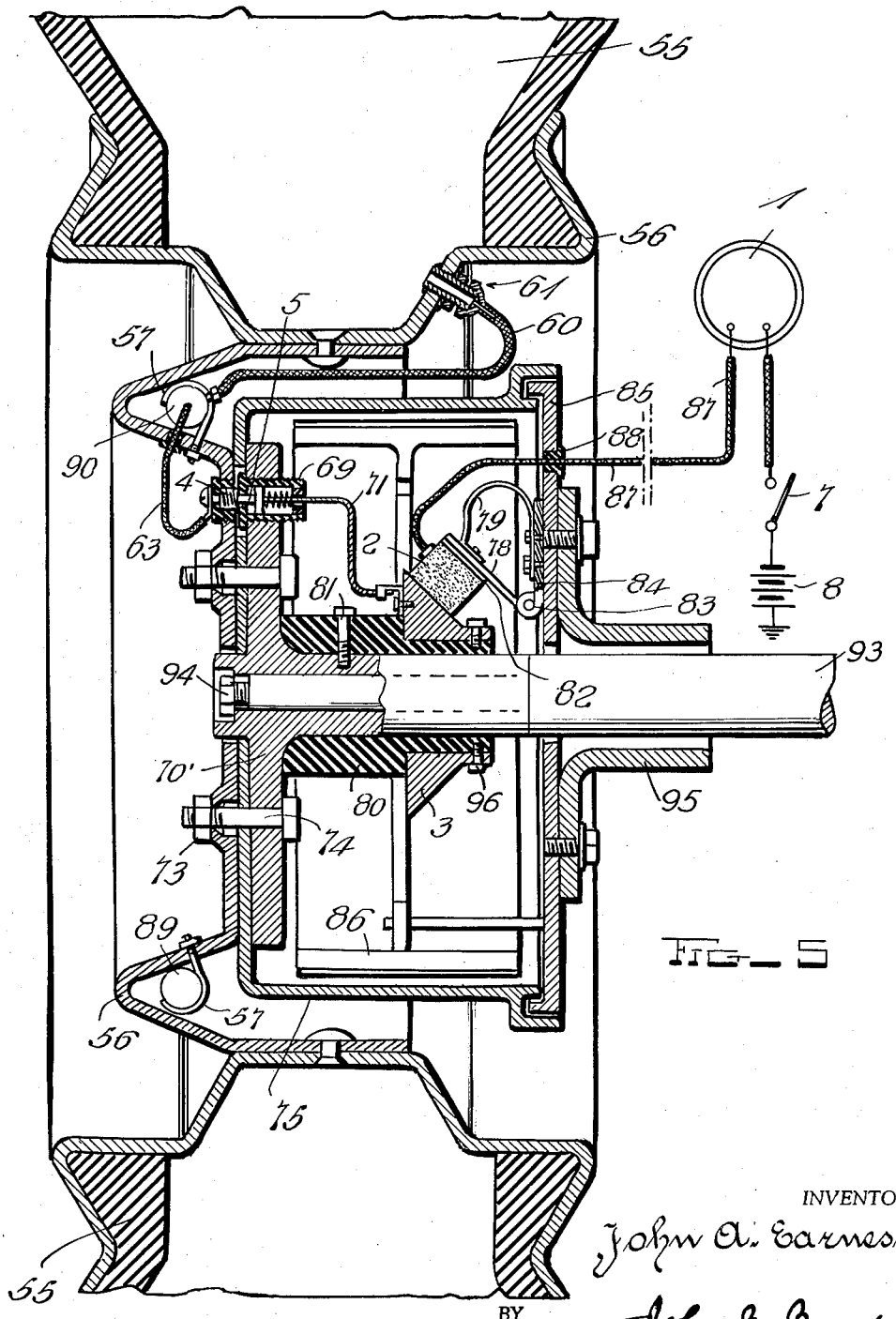

Fig. 4 is a vertical transverse sectional view of a front wheel hub and bearing assembly partially disassembled from the spindle assembly and particularly indicating the purpose of the brush holder spring action; and Fig. 5 is substantially a vertical transverse sectional view of a vehicle's entire rear wheel assembly and showing particularly the relationship between the components of my invention in order to complete the electrical circuit from the vehicle proper to the revolving portion of the wheel assembly.

My invention is directed to the construction of an electrical system whereby the operator of a vehicle may have an indication of the pressure in each of the vehicle tires at the same time or a warning indication when the pressure in each of the tires varies outside certain safe limits. The indicating devices are controlled by electric currents which in turn are controlled by pressure sensitive devices mounted on the tire rims. They are mounted on the rims in such manner as not to interfere with the operation of changing tire casings on the rims. The electric circuit is completed between the tire rim and the rotating brake drum assembly by a spring-loaded contact point such that the circuit is automatically closed when the tire rim is installed on the vehicle. The electric circuit is completed between the rotating portion of the wheel assembly and the stationary portion, or vehicle proper, by means of a contact ring installed on the former, and a spring-loaded brush assembly installed on the latter which bears on the contact ring, thus completing the electric circuit to the indicating devices between the rotating and stationary components of the wheel. The contact ring and brush assembly are installed inside the brake drum housing in such manner as not to interfere with maintenance operations within the brake drum housing and for the purpose of protecting them from the elements, thus insuring good electrical contact.

In systems of this general character heretofore, airtight pneumatic connections between the revolving portion of the wheel and the stationary portion of the vehicle had to be maintained and when maintenance was necessary on a wheel there was the inconvenience of having to mechanically disconnect the air-line when the tire was removed. Other type systems were dependent upon the tilting of the axle caused by deflation of one of the tires, but this system had the disadvantage of the tilting action of the axle due to the slant of different road surfaces.

Another type system using a stratoscopic disc associated with rotating shafts from each wheel was dependent upon the speed of the different wheels for its indication, but this system had the disadvantage of the many rotating shafts and gear boxes, thus increasing the probability of malfunctions, making it generally complicated to install.

In still other types of electrical systems the pressure responsive devices rotating with the wheel were usually mounted on the tire valve stem, thus adding to the difficulty of removing the tire from the rim, and all these pressure responsive devices employed in such systems were specially constructed, thus making the system cost excessive if not impracticable. Also, in these systems some electrical connection had to be disconnected before the tire could be removed from the vehicle thus adding to the labor involved, and in those systems using a contact ring and wiper assembly no provisions were made to shield the same from the elements, thus making system malfunctions more probable.

In my system the circuit-closing devices offer no interference at all with the tire change operation or with other maintenance operations within the brake drum assembly. Also, in my system the control units or pressure switches are mounted on the tire rims in such a way as to offer no interference at all with the operation of installing a new tire casing on the tire rims.

In referring to the drawings in more detail, similar numerals refer to similar parts throughout the specification:

The operation of this system for remote indications of vehicle tubeless tire pressure depends on the response of a bimetallic gage and a pressure sensitive bimetallic control unit to the heating effect of the average value of the direct current existing in the control circuit.

In Fig. 1 I have shown a partial back view of a tire 55 mounted on rim 56, removed from the vehicle, and showing the mounting location of low and high pressure switches 29 and 30 on said rim 56. The pressure switches are mounted 180° from each other in order to assist in keeping the tire in balance.

In Fig. 2 I have shown a sectional view taken substantially along line 2—2 of Fig. 1 and showing particularly the manner of mounting the pressure switches on the tire rim.

Referring to Figs. 1 and 2 in more detail, numeral 55 designates a tubeless tire mounted on tire rim 56 whose mounting holes are designated by 58. Pressure switches 29 and 30, which are interchangeable, are mounted in valley 59 of rim 56 by brackets 57. Pressure hoses 60 and pressure connection assembly 61 accomplish the pressure connection between the pressure switches and the tubeless tire pressure cavity 62. The pressure switches are usually grounded through the hose connection also, unless the particular type pressure switch used provides other grounding means. The two pressure switches are connected in electrical parallel by wire 64. Wire 63 passes through grommet 65 in rim 56 to electrically connect the parallel pressure switches with the rim element of the quick disconnect point 4.

I have shown the construction of the quick disconnect point of my invention in Fig. 3. Rim contact point 4 is constructed of an electrically conductive material, such as brass, and is threaded into insulation member 66 which in turn is either pressed or threaded into rim 56. Wire 63 is connected to contact point 4 by screw 67. The hub element of the quick disconnect point consists of a spring loaded contact point 5, constructed of an electrically conductive material, encased in insulation member 69 which is pressed or threaded into hub assembly 70. Wire 71 connects contact point 5 with contact ring 3. This device establishes electrical connection between the pressure switch components on the removable tire rim and the remainder of the circuit components on the vehicle proper and enables the tire and rim assembly to be removed and reinstalled with nothing to disconnect. However, the wheel must be reinstalled in the same position as it was removed in order for contact points 4 and 5 of the quick disconnect point to make contact and complete the electric circuit to the indicating gage 1.

As shown in Fig. 3, the tire rim 56 as shown is not fastened securely to the hub assembly. By tightening mounting nut 73 on mounting bolt 74, rim 56 moves to the right and bears on brake drum housing 75. When this happens rim contact point 4 bears on hub contact point 5 and causes it to compress spring 76, thus insuring a good electrical connection between these two points with this spring loading action.

In Fig. 4, I have shown a substantially vertical sectional view of a front wheel, hub and bearing assembly 70, partially removed from spindle assembly 77, and partially illustrating that brush holder 78 is retained in an uplifted position by leaf spring 79 when the hub and bearing assembly 70 is removed. The bearing assembly 70 includes a sleeve bearing 91 and a bolt bearing 92 for spindle assembly 77.

In Fig. 5 I have substantially shown a vertical sectional view of an entire rear wheel assembly and illustrating particularly the components employed and their arrangement in order to complete the electrical circuit from the rotating elements of the wheel assembly to the stationary components of the vehicle. The drive shaft is shown at 93 carrying the hub assembly 70' secured by detachable fastening 94 on the end thereof. Housing 95 concentrically surrounds drive shaft 93.

Referring to Figs. 4 and 5, 80 is an insulation ring member press fitted to hub assembly 70 or 70', as the case may be, and secured by bolt 81 to same and providing means for attaching an electrically conductive contact ring 3. This contact ring 3 is connected to the hub element 5 of the quick disconnect point by wire 71 and is secured to the insulation ring member 80 by fastening means 96. The face of contact ring 3 has an angle of approximately 45° with the horizontal to permit speedy and easy removal and reinstallation of the hub assembly 70 or 70', to which it is secured, without having to disconnect any elements.

Carbon brush 2 is secured to brush holder arm 78 but insulated from same by insulation 82. Brush arm 78 is hinged at point 83 to brush mounting plate 84 which in turn is secured to the plate or brake mounting flange 85, that is, to the same plate to which brake shoe 86 is attached. Leaf spring 79 attached to brush arm 78 and mounting plate 84 holds brush 2 in such position that its face is at an angle of slightly less than 45° with respect to the horizontal. The purpose of spring 79 is twofold. Its first purpose is to hold brush 2 in such a position so as not to interfere with removal and reinstallation of hub assembly 70 or 70', as can be seen from Fig. 4, where the hub assembly 70 is partly removed from spindle assembly 77. In Fig. 4 it will be noted that brush 2 is held at approximately a 40° angle, by leaf spring 79, ready to receive contact from ring 3 when the hub assembly is reinstalled. Spring 79 holds the brush at an angle slightly less than 45° (example 40° as above) in order to give brush 2 a spring-loaded action when it bears on the face of contact ring 3. This is the second purpose spring 79 serves. This spring loading action insures proper tension and thus a good electrical connection between carbon brush 2 and contact ring 3 when the vehicle wheel and contact ring 3 are in motion.

Wire 87, attached to carbon brush 2, passes through grommet 88 in brake mounting flange 85 and is attached to its corresponding gage 1 or indicator light on the vehicle dashboard to complete that branch of the parallel circuit.

In Fig. 5 reference character 89 designates a dummy weight secured to rim 56 by bracket 57. This weight is installed with the applications of my invention, which requires only a single control unit per wheel, or a single pressure switch (single-pole, double-throw) per wheel. The purpose of the weight is to assist in keeping the wheel in balance; therefore it is mounted 180° from the other unit 90 to compensate for the tire unbalance caused by the use of a single unit alone. As set forth in Fig. 1, this problem is solved when using a high and low pressure switch on the same installation, by mounting them 180° from each other.

While I have described my invention in certain preferred embodiments I realize that modifications may be made and I desire that it be understood that no limitations upon my invention are intended other than may be imposed by the scope of the appended claims.

What I claim as new and desire to secure by Letters Patent of the United States, is as follows:

1. An electrical circuit slip ring assembly comprising a driving shaft having a detachable fastening on the end thereof, a housing concentrically surrounding said shaft and terminating in a plate extending normal to the axes of said housing and shaft, a removable sleeve assembly adapted to be mounted on said shaft, a flange connected with said sleeve assembly in a position spaced from said plate and constituting a removable sleeve assembly, a hub of insulation material carried by said sleeve assembly, a contact ring mounted on said hub for rotative movement under control of said driving shaft, and having a beveled face inclined towards the axis of said shaft displaced from the detachable fastening on the end thereof to an apex lying substantially in the plane of said plate when said sleeve assembly is secured in position by the detachable fastening on the end of said shaft, a contact brush supported by said plate in sliding contact with the beveled face on said contact ring, an electrical connection extending from said brush through said plate and another electrical connection extending from said contact ring through said flange whereby said sleeve assembly may be removed or reinstalled with respect to the detachable fastening on the end of said driving shaft and the continuity of the electrical circuit between the connection from said brush and the connection from said contact ring established through the rotative contact between said contact ring and said brush.

2. An electrical circuit slip ring assembly as set forth in claim 1 in which said hub of insulation material has an annular shoulder formed therein providing an annular abutment face for the back of said contact ring opposite said beveled face for maintaining said beveled face in rotating contact with said contact brush when said bearing sleeve assembly is secured in position by the detachable fastening on the end of said driving shaft.

3. An electrical circuit slip ring assembly as set forth in claim 1 in which said contact ring includes a cylindrical portion extending from the beveled face thereof and wherein said contact ring is secured to said hub of insulation material by fastening means extending through said cylindrical portion into said hub of insulation material.

4. An electrical circuit slip ring assembly as set forth in claim 1 in which there is an arm interposed between said contact brush and said plate constituting a brush holder and wherein there is a spring device located between said brush holder and said plate for biasing said brush into connection with the beveled face on said contact ring.

5. An electrical circuit slip ring assembly as set forth in claim 1 in which there is an arm interposed between said contact brush and said plate constituting a brush holder and wherein there is a leaf spring which extends between said plate and said brush holder for yieldably biasing said brush into electrical connection with the beveled face of said contact ring while said contact ring is rotated.

6. An electrical circuit slip ring assembly as set forth in claim 1 in which the beveled face on said contact ring is inclined at substantially 45° with respect to the axis of said driving shaft whereby said brush is partially supported gravitationally by the beveled face of said contact ring while the contact ring is rotated.

7. An electrical circuit slip ring assembly as set forth in claim 1 in which there is an arm interposed between said contact brush and said plate constituting a brush holder and wherein there is a leaf spring disposed between said plate and said brush holder for yieldably biasing said brush to an angular position which is approximately 40° with respect to the axis through said driving shaft whereby the beveled face of said contact ring and the face of the brush are maintained in substantial conductive electrical connection while said contact ring is rotated.

8. An electrical circuit slip ring assembly as set forth in claim 1 in which said flange of said sleeve assembly carries a cylindrical drum which coacts with said plate and wherein said drum encloses said contact ring and said contact brush.

References Cited in the file of this patent

UNITED STATES PATENTS

| | | |
|---|---|---|
| 2,482,984 | Lana et al. | Sept. 27, 1949 |
| 2,550,041 | Cozzolino et al. | Aug. 25, 1951 |
| 2,621,274 | Maddox | Dec. 9, 1952 |

FOREIGN PATENTS

| | | |
|---|---|---|
| 519,007 | Great Britain | Mar. 13, 1940 |